(12) United States Patent
Krebs et al.

(10) Patent No.: US 8,203,907 B2
(45) Date of Patent: Jun. 19, 2012

(54) UPDATING VELOCITY MODELS USING MIGRATION VELOCITY SCANS

(75) Inventors: Jerome R. Krebs, Houston, TX (US); Lorie K. Bear, Sugar Land, TX (US)

(73) Assignee: ExxonMobile Upstream Research Company, Houston, TX (US)

( * ) Notice: Subject to any disclaimer, the term of this patent is extended or adjusted under 35 U.S.C. 154(b) by 670 days.

(21) Appl. No.: 12/300,093

(22) PCT Filed: Mar. 16, 2007

(86) PCT No.: PCT/US2007/006680
§ 371 (c)(1),
(2), (4) Date: Nov. 18, 2008

(87) PCT Pub. No.: WO2007/145694
PCT Pub. Date: Dec. 21, 2007

(65) Prior Publication Data
US 2009/0116336 A1    May 7, 2009

Related U.S. Application Data

(60) Provisional application No. 60/812,813, filed on Jun. 12, 2006.

(51) Int. Cl.
*G01V 1/00* (2006.01)
(52) U.S. Cl. .......................................... 367/73; 367/50
(58) Field of Classification Search .............. 367/50–52, 367/73; 702/18
See application file for complete search history.

(56) References Cited

U.S. PATENT DOCUMENTS

| | | | | |
|---|---|---|---|---|
| 6,546,339 | B2 * | 4/2003 | Bevc et al. | 702/18 |
| 6,577,955 | B2 * | 6/2003 | Guillaume | 702/14 |
| 6,687,618 | B2 * | 2/2004 | Bevc et al. | 702/14 |
| 6,868,039 | B2 * | 3/2005 | Broto | 367/73 |
| 7,355,923 | B2 * | 4/2008 | Reshef et al. | 367/53 |
| 7,388,808 | B2 * | 6/2008 | Lee et al. | 367/50 |

OTHER PUBLICATIONS

Behrens, J. (2005) "The Detection of Electrical Anisotropy in 35 Ma Pacific Lithosphere: Results from a Marine Controlled-Source Electromagnetic Survey and Implications for Hydration of the Upper Mantle," Ph.D. Thesis, University of California, San Diego, pp. 37-39 and 86-93.

(Continued)

*Primary Examiner* — Jack W Keith
*Assistant Examiner* — Krystine Breier
(74) *Attorney, Agent, or Firm* — ExxonMobile Upstream Research Company Law Dept.

(57) ABSTRACT

Method for updating a velocity model (926) for migrating seismic data using migration velocity scans with the objective of building a model that reproduces the same travel times that produced selected optimal images from a scan. For each optimal pick location (914) in the corresponding test velocity model (916), a corresponding location is determined (922) in the velocity model to be updated, using a criterion that the travel time to the surface for a zero offset ray (918) should be the same. Imaging travel times are then computed from the determined location to various surface locations in the update model (924), and those times are compared to travel times in the test velocity model from the optimal pick location to the same array of surface locations. The updating process consists of adjusting the model to minimize the travel time differences (934).

15 Claims, 9 Drawing Sheets

OTHER PUBLICATIONS

Belcher, E. O. et al. (1999) "Beamforming and Imaging With Acoustic Lenses in Small, High-Frequency Sonars", *Oceans '99 Conference*, Seattle, Washington.

Chave, A. D. et al. (1991) "Electrical Exploration Methods for the Seafloor," *Electromagnetic Methods in Applied Geophysics* (ed. M.N. Nambighian), vol. 2, Chap. 12, pp. 931-966.

Constable, S. et al. (1996) "Marine Controlled-Source Electromagnetic Sounding," *J. Geophs. Res.*, vol. 101, pp. 5519-5530.

Duncan, R. (2005) "Sensing Shape," *SPIE's oemagazine*, Sep. 2005, pp. 18-21.

de Jong, C. D. et al. (2002) *Hydrography*, ISBN 90-407-2359-1, DUP Blue Print, Delft University Press, pp. 311-317.

Morgan, M. J. (1978) *Dynamic Positioning of Offshore Vessels*, by Max J. Morgan, ISBN 0-87814-044-1, PPC Book Division, The Petroleum Publishing Co, pp. 74-85.

\* cited by examiner

UPDATING VELOCITY MODELS USING MIGRATION VELOCITY SCANS

This application is a National Stage entry under 35 U.S.C. 371 of PCT/US2007/06680 that published as WO 2007/145694 and was filed on Mar. 16, 2007 and claims the benefit of now expired U.S. Provisional application 60/812,813 which was filed on Jun. 12, 2006.

FIELD OF THE INVENTION

The invention relates generally to the field of geophysical prospecting and, more particularly, to seismic data processing. Specifically, the invention is a method for updating velocity models using migration velocity scans.

BACKGROUND OF THE INVENTION

The accuracy of seismic imaging is largely determined by the ability to produce a subsurface velocity model that accurately predicts the seismic travel time from subsurface imaging points to seismic sources and receivers. The imaging velocity models are commonly estimated by finding a model that can predict the residual depth error in prestack migrated surface seismic gathers. Residual depth error is a measure of the inconsistency of prestack migrated surface seismic data as a function of some imaging gather variable. Examples of imaging gather variables include source-receiver offset distance and subsurface angle of incidence. If the velocity model used in the prestack migration is accurate then the depths of reflections in the image should be consistent as a function of the imaging gather variable. Otherwise the depth inconsistency can be used as information to update the migration velocity model.

Basing a velocity model on prestack migration residual depth error can be a problem if:
1. The seismic gather traces, from the current estimate of the velocity model, are so noisy that residual depth error cannot be accurately measured (i.e. coherent events cannot be seen), or
2. The maximum angle of incidence at the reflector of interest is limited due to overburden anomalies (e.g. salt bodies in the overburden tend to limit maximum angle of incidence). Image gathers then exhibit very little depth inconsistency, even if the velocity model is significantly inaccurate. Thus, the information from these gathers is of little value for updating the velocity model.

These limitations can often be overcome by fitting the imaging model to information derived from prestack migration velocity scans. A prestack migration velocity scan is simply a set of images created using a suite of test velocity models. Each image is obtained by migrating the surface seismic data with a test velocity model and stacking (summing) the resulting gather traces. This is in contrast to migrating with a single estimate of the velocity model and looking at the gather traces before stacking, as discussed above. Migration velocity scans help solve problem (1) above, because one common cause of noisy imaging is that the current estimate of the subsurface velocity model is too inaccurate to produce a clean image of the subsurface. By comparing the images, one can choose the velocity model that produces the best image. Velocity scans can mitigate both problems identified above, because when the character of the gathers cannot be used to determine an optimal velocity, one can use the geologic reasonableness of the different images in the velocity scan as a type of information on which to base velocity model updating. Examples of geologic reasonableness are that reflectors should not cross in the image, and faults should be sharply focused.

When using velocity scan data to update a velocity model, the seismic processing analyst typically chooses the velocity model, from the scan suite, that produces the optimal image. Criteria for determining the optimal image include greatest stacked image power, greatest signal-to-noise ratio, most geologically reasonable image and greatest resolution. Typically the optimal image at one location is not the optimal image at another location—the choice of optimal velocity in the scan will vary spatially (including in the depth dimension) in the image volume. One major problem with using velocity scans to update a velocity model is that it is not straightforward to accurately update the current migration velocity model based on the information implied by the spatially varying optimal velocity model choices. This invention pertains to this problem of updating a velocity model based on velocity scan data. Next, the aforementioned concepts are discussed in somewhat more detail.

The quality of a seismic image is determined largely by the accuracy with which the seismic travel time between all surface and sub-surface locations can be computed. Thus, the goal of velocity estimation and model building is to build a model that will produce accurate traveltimes. I should be noted that there are many velocity models that will produce essentially the same travel times. So a goal of producing accurate travel times is easier to achieve than a goal to produce accurate velocities. In other words, an inaccurate velocity model can still produce accurate travel times resulting in an image that is just as accurate as if the correct velocity model had been used.

Velocity Model Data Types

There are many types of data that can be used to constrain a velocity model. Table 1 provides a listing of the most commonly available types of data. It is advantageous to constrain models with as many different types of data as possible, since each data type has different strengths and weaknesses.

TABLE 1

| | Description |
|---|---|
| Surface Seismic Reflections | Differences in travel time between traces corresponding to some imaging gather variable (such as source-receiver offset) provide information about the subsurface velocity. When the velocity model is correct then images should all be consistent as a function of the imaging gather variable. |
| Vertical Checkshots | Measurements of travel time from a source at the surface placed vertically over receivers in a well. |
| Surface Seismic Direct Arrivals | Measurements of travel time for a source at the surface directly (without reflection) to a receiver at the surface. These are usually the first arrival on a seismic trace. |
| Formation | Measurements of depths to a subsurface rock formation. |

TABLE 1-continued

| | Description |
|---|---|
| Tops Offset Checkshots | Measurements of travel time from sources at the surface to receivers in a well. The sources are positioned at a variety of lateral offsets relative to the receiver location. |
| Sonic Logs | Fine-scale direct measurements of seismic velocities in a well. |

Figure 1:
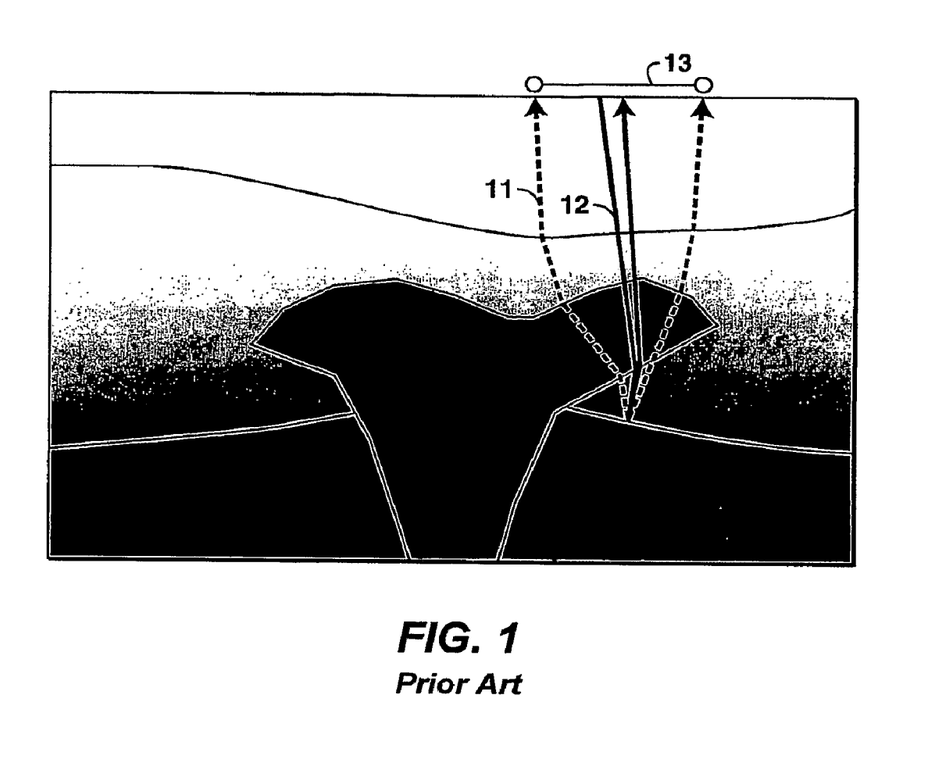
FIG. 1 is a diagram illustrating differences in surface seismic travel times for sources and receivers at different offsets can be used to constrain the subsurface velocity.

Surface seismic data are the primary piece of data used to constrain velocity models, because they are almost always the only piece of data that provide information covering the entire model both laterally and in depth. For unmigrated surface seismic data, differences in travel time between seismic traces having a common midpoint but different offsets are used to infer the subsurface velocity. FIG. 1 shows ray 11 corresponding to a relatively long offset 13, and ray 12 corresponding to a short offset (source-receiver spacing). Since rays corresponding to different offsets travel through different parts of the subsurface, differences in surface seismic travel times for sources and receivers at different offsets can be used to constrain the subsurface velocity. For prestack depth migrated surface seismic data, differences in imaged depth between traces corresponding to different offsets (residual depth error) are used to infer subsurface velocity.

Velocity Model Building Strategy

Figure 2:
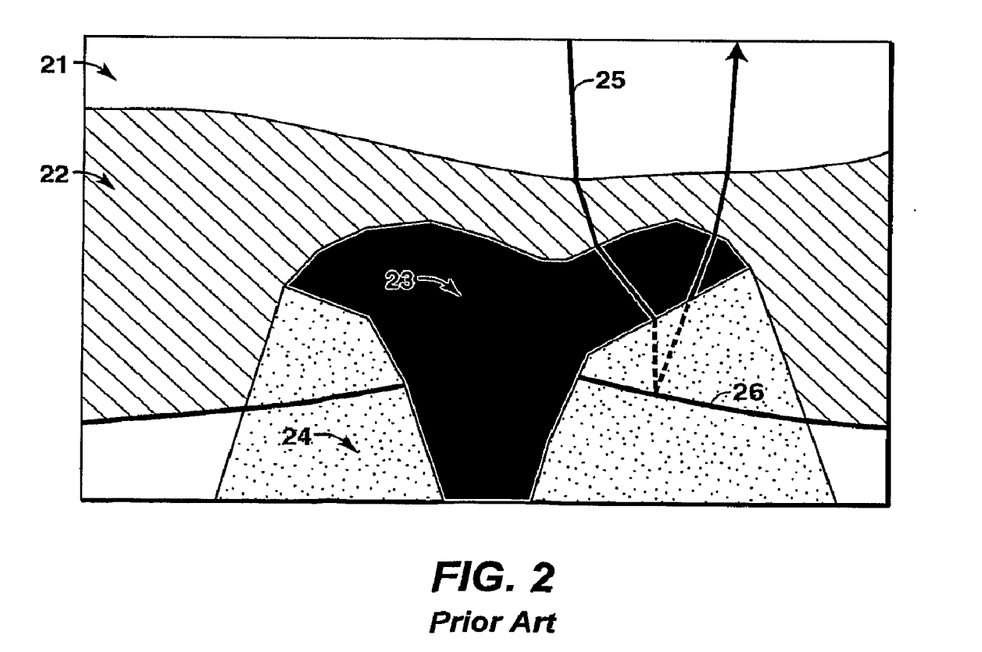
FIG. 2 is a schematic diagram illustrating region stripping method for building velocity model.

Velocity models are frequently built in a region stripping manner. Region stripping means that the model is partitioned into regions (see FIG. 2), often corresponding to major velocity discontinuities (e.g. sediments and salt). The velocity in each region is then determined in a hierarchical manner, i.e. before determining the velocity in a given region the velocity is estimated in all regions through which rays from that region of interest must pass. Typically this implies a top-down workflow as shown in FIG. 2, where ray 25 is shown reflecting from subsurface reflector 26, passing through four distinct (in terms of their sound propagation velocity) regions in the process. The velocity is first determined in region 21. This is followed by determining the velocity in region 22, then in region 23. At this point the travel time along the solid part of the ray is approximately correct (depending on the accuracy of the velocities estimated in regions 21 to 23). Determining accurate travel times for the dashed part of the ray path is the goal of determining the velocity in region 24. In some cases, it is useful to perform migration with a suite of different velocities in the region where velocities are being estimated. These are called migration velocity scans. A typical workflow for region stripping is shown in FIG. 3.

Figure 3:
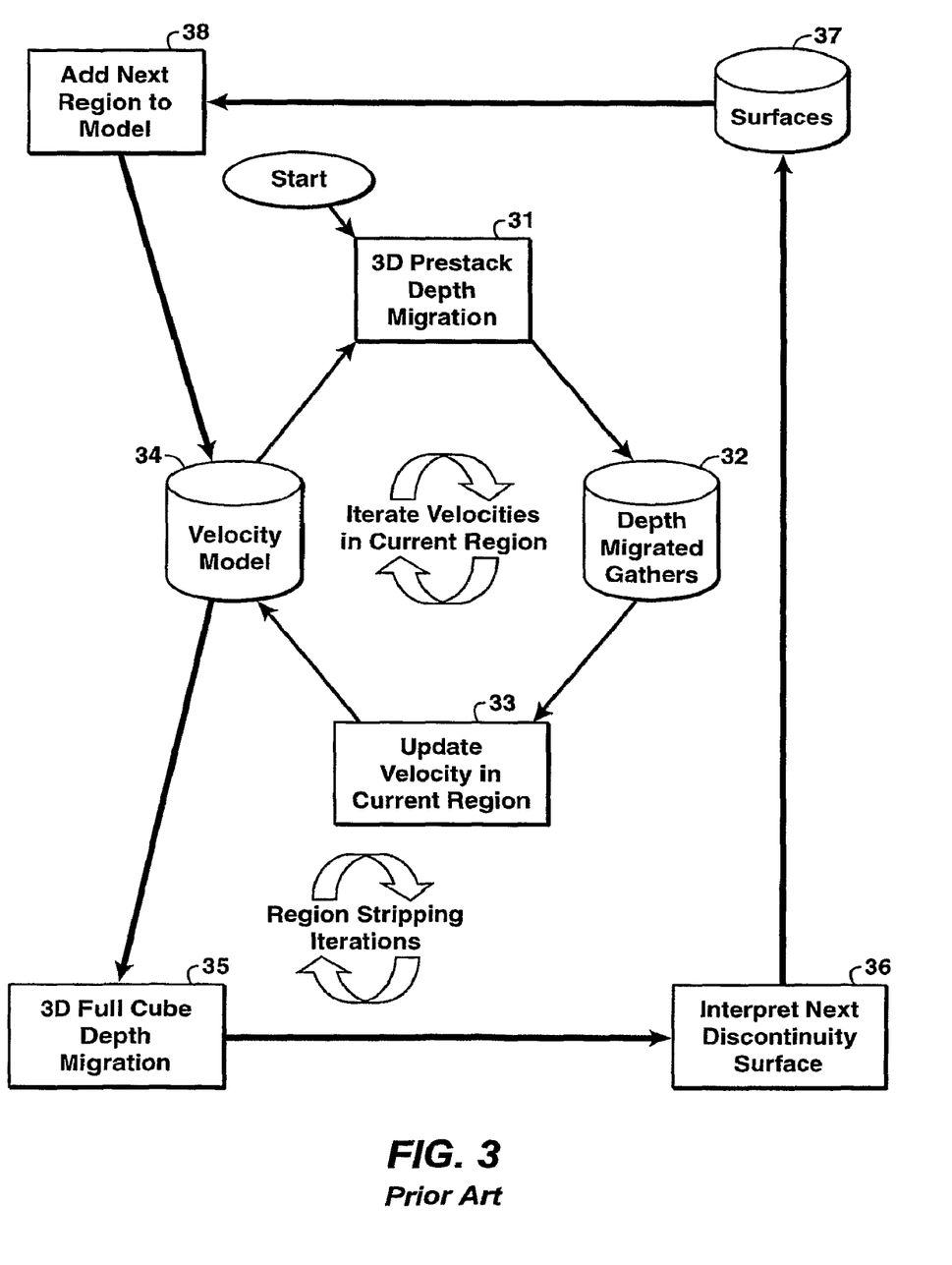
FIG. 3 is an example workflow for the region stripping strategy.

In FIG. 3, the bold arrows indicate the region-stripping portion of the workflow. This workflow uses iterative 3D prestack depth migration to update the velocity within each region. Region boundaries are defined by interpreting them from data that are depth migrated with the current version of the model. Some initial velocity model is assumed at 34. The iterative cycle 31-34 is performed in region 21 (using FIG. 2 as an example). This determination is based on interpreting in the seismic data a reflection event corresponding to the interface between regions 21 and 22. At step 33, the velocity model is adjusted (updated) based on prestack migration residual depth error. When the acoustic velocity in region 21 is determined, the steps 35-38 are performed. At step 36, the interface between regions 22 and 23 is identified in the depth migrated data and added to the known region boundaries at 37, defining region 22 in the model at step 38. The inner iteration loop in FIG. 3 is then implemented until a velocity function (of the spatial variables) for region 22 is determined, and so on region-by-region.

Layer stripping strategy is a subset of the region stripping strategy. In layer stripping, the regions used are chosen to have sufficiently limited vertical extent so that a very simple parameterization of the vertical change in velocity can be used (e.g. the velocities are vertically constant or a linear function of depth). Layer stripping also implies that seismic information from deep regions is not used to update the velocity in shallower layers. The combination of thin layers and discarding of information from deep regions leads to some degree of vertical instability in layer stripping and also makes it impossible for layer stripping to determine velocity models in some geologic situations. An example of a geologic situation that cannot be solved by layer stripping is a shallow gas anomaly which generates no reflection, and therefore the only information about the velocity in the anomaly is in the deeper reflections.

Velocity Estimation Methods

Table 2 describes several specific velocity estimation techniques that can be used in the strategies discussed in the previous section. Each technique is described in somewhat more detail in the paragraphs that follow Table 2.

TABLE 2

| | Description |
|---|---|
| Vertical Updating (Deregowski) | Measure residual curvature in common image gathers and convert to interval velocity using Dix equation |
| Model Based Manual Updating | Forward model all data types, visualize fit to data, and interactively adjust model to improve fit |
| Tomography | Measure residual curvature in common image gathers and use mathematical optimization to find best fit model |

Vertical Updating (Deregowski)

Figure 4:
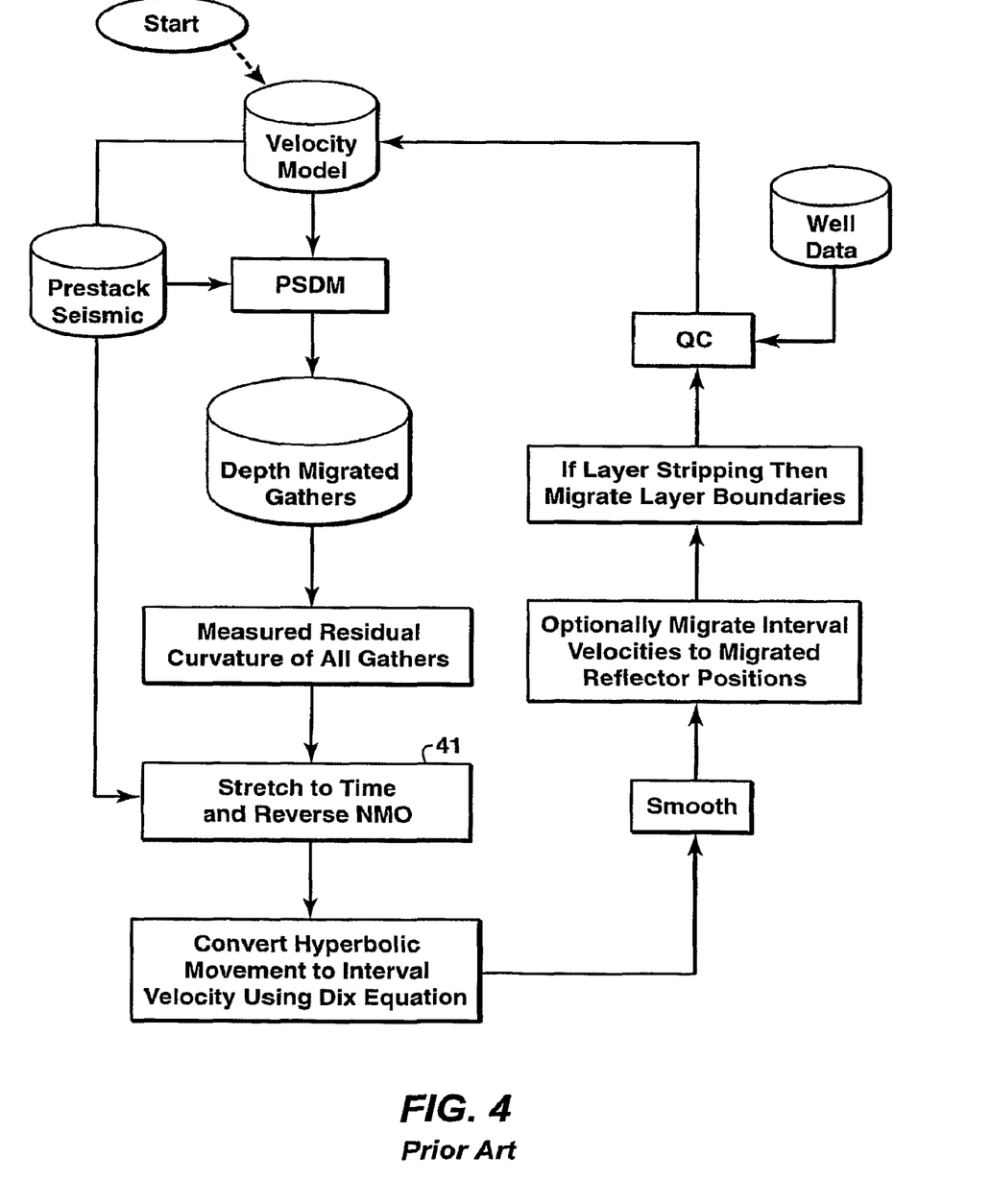
FIG. 4 is a flow chart for a conventional method for performing vertical updating.

Most velocity model updating packages support some sort of vertical updating procedure (Deregowski, "Common-offset migration and velocity analysis," *First Break* 8, 225-234 (1990)). Vertical updating means that velocity function updates at a location are based on migrated seismic data in the vicinity of that location. FIG. 4 shows the conventional method used for performing vertical updating. Residual depth error is picked on common image gathers. Depth error is converted back to time moveout using the migration velocity. Time moveout is converted to interval velocity using the well known Dix equation. Note that vertical updating is an iterative process, with prestack depth migration applied once during each iteration. Vertical updating also requires smoothing to mitigate errors introduced due to instability of the method. Step 41 is often hidden from the user.

Model Based Manual Updating

Figure 5:
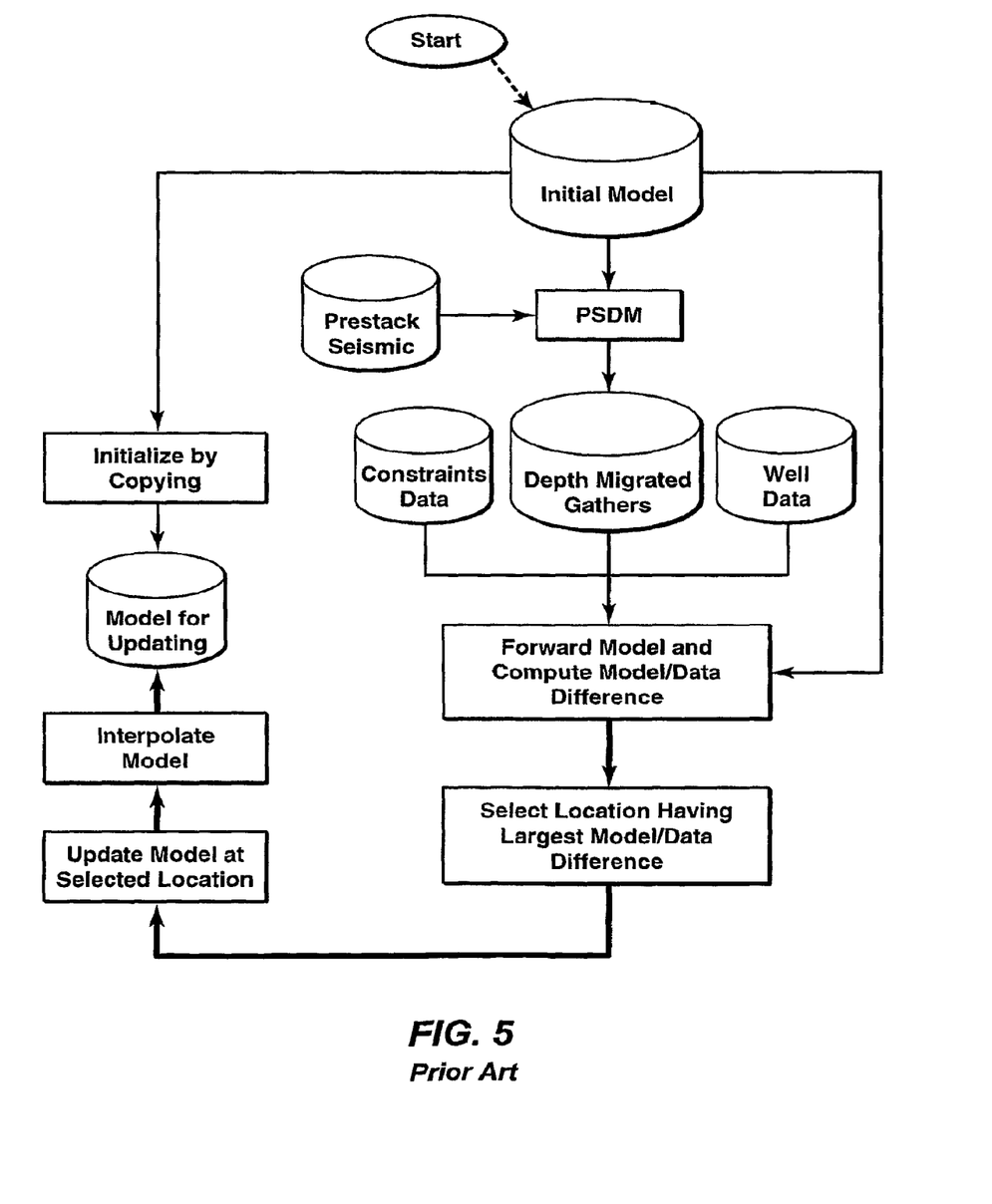
FIG. 5 is a diagram illustrating the model based manual updating method for one iteration of updating.

FIG. 5 illustrates an implementation of model based manual updating (see U.S. Pat. No. 6,253,157 to Krebs). The method uses forward modeling to predict, from the current model, the data that would be measured if that model were correct. The synthetic data are then compared to the measured data, and the user adjusts the model to improve the match. The updated model becomes the initial model for the next iteration. This process is employed at a sparse set of locations, and the model is smoothly interpolated between those locations.

Tomography

Figure 6:
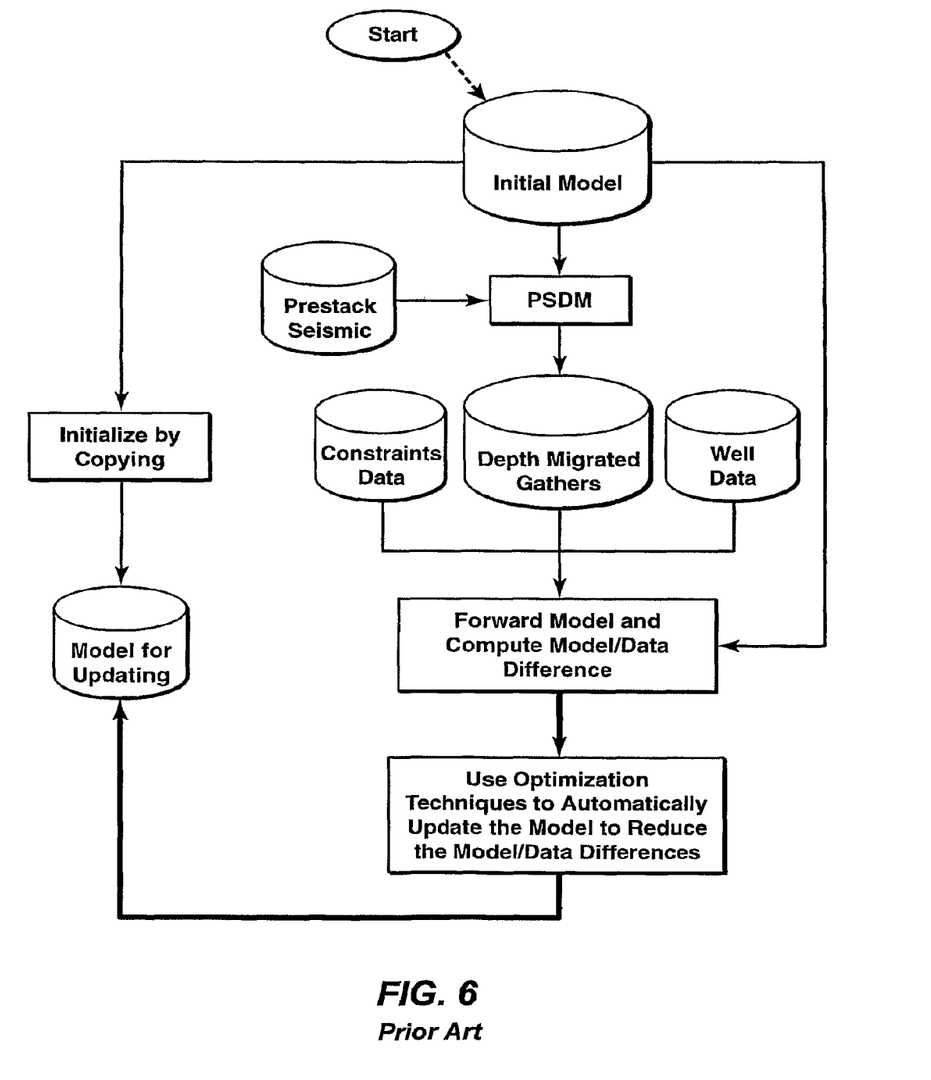
FIG. 6 is a diagram illustrating the tomographic method for one iteration of updating.

Tomography is very similar to model based manual updating. The main difference is that tomography employs mathematical optimization to update the model, rather than having an interpreter manually adjust the model. Tomography can be implemented in either the migrated or unmigrated domain. However, most modern tomography approaches are implemented in the migrated domain, because it improves stability. FIG. 6 is a diagram illustrating a possible implementation of the tomographic method. The updated model becomes the initial model for the next iteration.

Migration Velocity Scans

There are two significant problems associated with constraining subsurface velocity models using surface seismic data:

1. An incorrect initial velocity model can leave the migrated data so disorganized that a velocity analysis display having satisfactory signal-to-noise ratio (S/N) cannot be produced. This can happen even if the velocities in the regions above the region of interest are largely correct.
2. In some situations the maximum angle of incidence for reflection raypaths below a velocity anomaly (see the ray path 25 in FIG. 2) is quite small. The ability to accurately resolve velocities from residual depth error in a migrated gather decreases when this maximum angle of incidence decreases.

Both of these problems can be addressed by constraining the model using migration velocity scans. A migration velocity scan is a set of seismic migrations performed with a suite of different velocity models. Usually, the suite of velocity models is formed by holding constant the velocity outside the region being updated, while varying the velocity within that region.

Migration velocity scans help solve problem (1) above, because there is a good chance that one of the velocity models in the suite will be accurate enough to provide satisfactory S/N imaging that can be used to constrain the velocity model. Note that the suite of models, in the scan, does not have to contain the actual subsurface velocity to get this S/N enhancement. As a matter of fact, typically one model in the suite will enhance S/N in one portion of the region of interest, while another model in the suite will enhance some other portion of the region. Another way that migration velocity scans solve problem (1) is that the interpreter often interprets the stack of the scanned images rather than the common image gathers themselves. Stacking provides an added boost to S/N.

Migration velocity scans can also solve problem (2) above, because indicators other than image gather residual depth error can be used to determine which velocity in the scan is producing the best image. In particular, the geologic feasibility and increased image resolution of the resulting images can be used to judge that one velocity model in the suite is superior to others. An example of a geologically infeasible image would be one that has reflections that cross. An example of increased image resolution is the focusing of faulted reflections to sharp terminations. Image gather residual depth error is controlled only by specular reflection ray paths. However, geologic feasibility and resolution are controlled by the combination of specular reflection and diffraction rays. This addition of diffraction rays makes it possible for migration velocity scans to provide information about travel times over a larger range of propagation angles, leading to increase velocity resolution.

Velocity Model Updating using Migration Velocity Scans

Recent publications propose a direct updating of the velocity model using the layer stripping strategy. See Pica, "Velocity scan for 3D-PreSDM model building: Fast traveltime reconstruction for isotropic and anisotropic media," 71st SEG meeting, Expanded Abstracts (2001); Fei and McMechan, "Fast model-based migration velocity analysis and reflector shape estimation," *Geophysics* 70, U9-U17 (2005); and X. Wang, et al., "Model based processing (IV): migration velocity analysis," 75th SEQ meeting, Expanded Abstracts, 2261-2264 (2005). They simply perform a migration velocity scan within each layer and then choose a laterally varying optimal velocity from the scans. This is an obvious use of migration velocity scans, but suffers from the vertical instability and geologic regime limitations of layer stripping discussed above.

Figure 7:
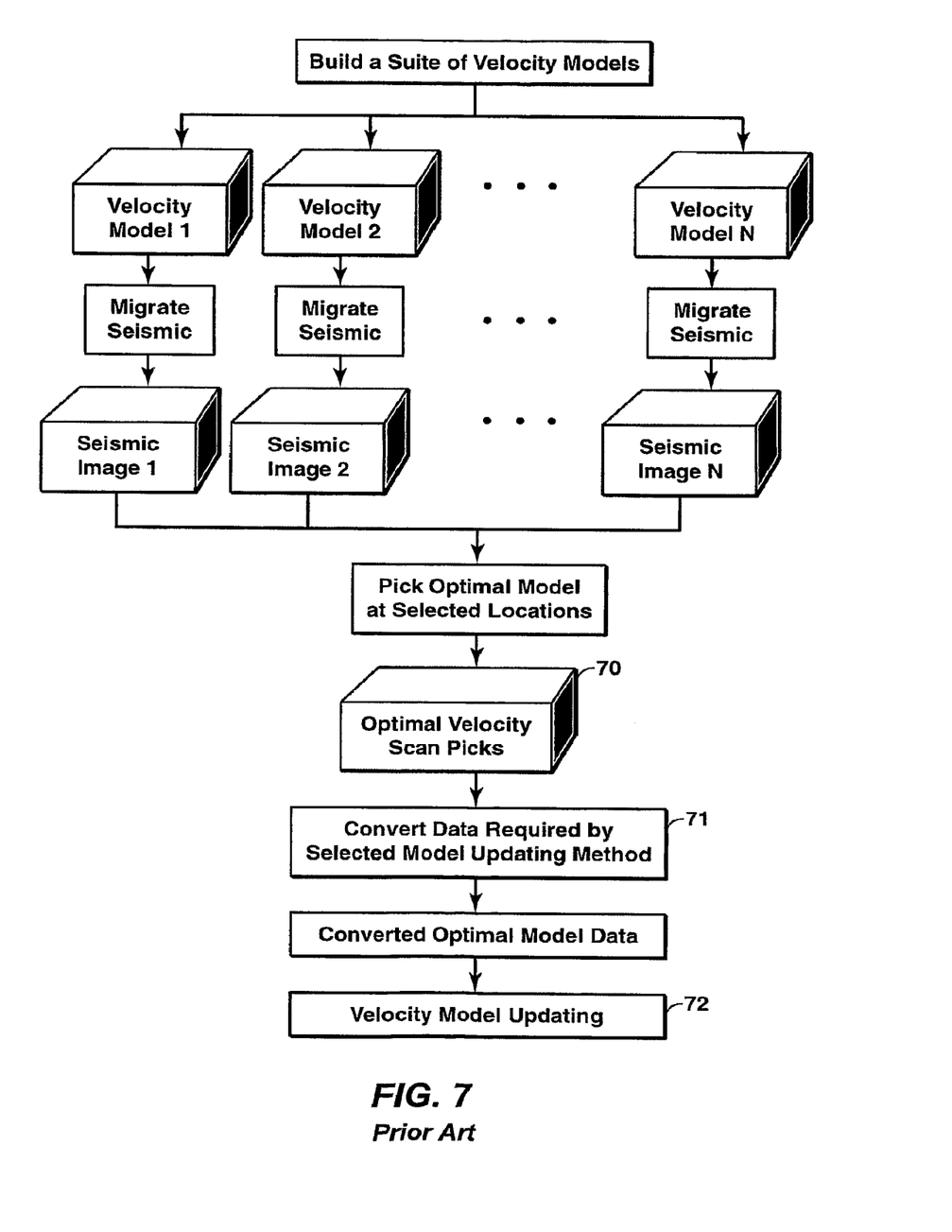
FIG. 7 is a conventional workflow for updating a velocity model using migration velocity scans.

Use of migration velocity scans in the more general region stripping strategy is not so obvious. Migration velocity scan data cannot be input directly to the model updating procedures discussed in the *Velocity Estimation Methods* section above. Therefore, the velocity scans must first be analyzed to produce data that are compatible with the chosen model updating method. Typically this analysis involves determining, throughout the image volume, which velocity in the scan produced the optimal image (see FIG. 7). This spatially varying optimal velocity data is then converted to the type of information required for the chosen model updating method. The converted data required at step 71 could be, for example, either hyperbolic velocity or residual depth error. This conversion usually involves some significant approximation. Examples of updating techniques at step 72 include Deregowski updating and tomography.

Audebert proposed converting optimal velocity scan picks to time moveout picks by using the time moveout corresponding to the RMS average of the picked optimal velocity model at the pick location. See Audebert, et al., "CRP-scans from 3D Pre-Stack Depth Migration: a powerful combination of CRP-gathers and velocity scans," 66th SEG Meeting, Expanded Abstracts, 515-518 (1996). These residual curvatures are then input to a Deregowski updating method. Note that this conversion to residual curvature assumes the subsurface velocities are laterally invariant, an assumption that is usually significantly violated in most regions where velocity scans are of greatest value.

In U.S. Pat. No. 6,577,955, Guillaume proposes picking the depth error and reflector dip on migrated gathers from the optimal velocity in a migration velocity scan. These depth errors are then kinematically inverse migrated to produce unmigrated reflection travel times. These unmigrated travel times are tomographically inverted to produce an updated velocity model. Note that this method cannot be applied to stacks of the optimal velocity scan images, thus some of the S/N enhancement advantage of migration velocity scans is lost. Furthermore this method deals exclusively with specular reflection rays and therefore loses some of the increase in velocity resolution available from migration velocity scans. B. Wang et al. propose a further refinement of this technique, suggesting inverse kinematic migration to a datum at the base of a velocity anomaly rather than the Earth's surface ("A 3D subsalt tomography based on wave-equation migration-perturbation scans," *Geophysics* 71, pages E1-E6 (2006)). This has the advantage of simplifying the tomographic update of the model below the anomaly, but again suffers from incomplete exploitation of the S/N and velocity resolution advantages of migration velocity scans.

SUMMARY OF THE INVENTION

In one embodiment, the invention is a method for generating a velocity model from seismic reflection data obtained from a subterranean survey region, said model giving seismic velocity as a function of location in the region, said method comprising:

(a) generating a velocity model of the subsurface region for updating (some initial model is needed to start the process);

(b) obtaining a migration velocity scan from the seismic data, said scan including a set of seismic images created by migrating the seismic data using a suite of test velocity models of the subterranean region;

(c) selecting an optimal pick from the velocity scan, said pick corresponding to a particular test velocity model and to a particular (x,y,z) location in the subterranean region;

(d) computing imaging travel times from the selected pick location to a plurality of locations on the subterranean region's surface using the test velocity model corresponding to the selected optimal pick;

(e) determining a surface location corresponding to an emergence point of a zero-offset ray from the (x,y,z) location corresponding to the selected optimal pick, using the test velocity model corresponding to the selected optimal pick;

(f) determining an update location in the velocity model for updating such that a zero-offset ray from the update location has substantially the same surface emergence location and travel time as the zero-offset ray from the (x,y,z) location corresponding to the selected optimal pick;

(g) computing imaging travel times from the update location to the plurality of surface locations selected in step (d) using the velocity model for updating; and (h) updating (adjusting) the update model to reduce any differences between the imaging travel times from the optimal velocity scan picks and the corresponding travel times from the velocity model to be updated.

In some embodiments of the invention, for example where the purpose is to use the velocity model to migrate the edges of a fault, steps (e) and (f) could be omitted, and in step (g), the "update location" would simply be the (x,y,z) location corresponding to the selected optimal pick.

In many embodiments of the invention, steps (c)-(g) are repeated for one or more additional optimal picks from the velocity scan, which picks can come from images associated with any of the test velocity models in the scan. Then, the velocity model for updating may be replaced by the adjusted update model followed by repeating steps (b)-(h), and further iterating until a pre-selected convergence criterion is satisfied or other stopping point is reached.

BRIEF DESCRIPTION OF THE DRAWINGS

The present invention and its advantages will be better understood by referring to the following detailed description and the attached drawings in which.

The invention will be described in connection with its preferred embodiments. However, to the extent that the following description is specific to a particular embodiment or a particular use of the invention, this is intended to be illustrative only, and is not to be construed as limiting the scope of the invention. On the contrary, it is intended to cover all alternatives, modifications and equivalents that may be included within the spirit and scope of the invention, as defined by the appended claims.

DETAILED DESCRIPTION OF THE PREFERRED EMBODIMENTS

Figure 8:
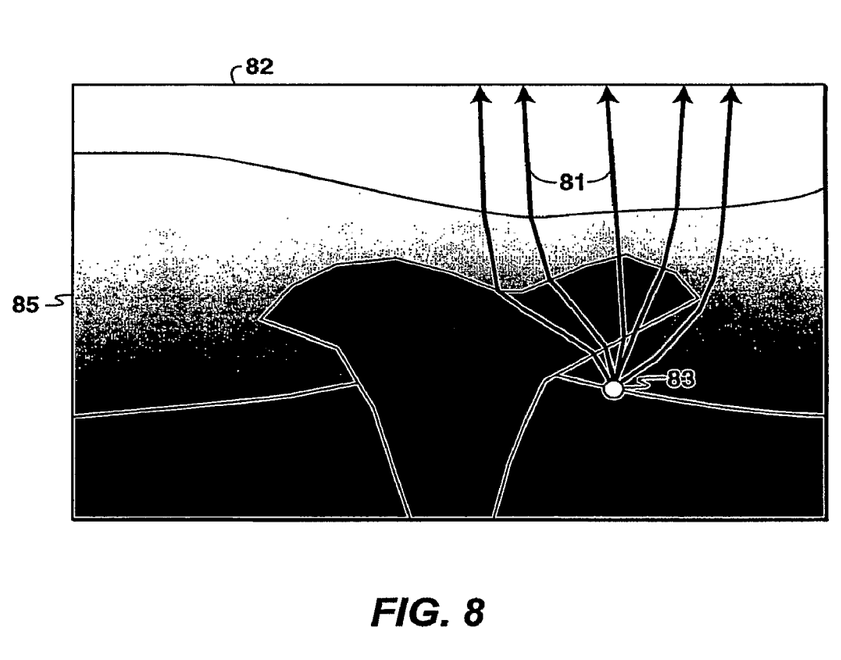
FIG. 8 is an illustration of rays corresponding to imaging travel times from the location of an optimal velocity scan model pick to the seismic datum.

The present invention is an iterative method for developing a seismic imaging velocity model that uses migration velocity scans to update the velocity model with the objective of building a model that reproduces the travel times that produced the optimal images from the scans (see FIG. 8). Therefore, an update of the velocity model will attempt to fit the imaging travel times that produced the optimal images in a migration velocity scan. It should be noted that the optimal velocity model from the scan suite usually varies spatially, and therefore the optimal imaging travel times will usually be computed from more than one model.

FIG. 8 is an illustration of rays 81 corresponding to imaging travel times from the location 83 of an optimal velocity scan model pick to the datum of the seismic sources and receivers 82 (for example, this datum might be sea level). The rays are traced through the velocity model that was used to generate the picked optimal velocity scan image. (The entire drawing 85 represents the velocity model, with velocity represented by shade of gray. In other words, velocity model 85 was determined to be the best model, from among the suite of models used in the velocity scan, for imaging subsurface location 83.) An updated model is built by fitting it to the travel times of these imaging rays. It may be noted that these imaging rays are the same as rays from a diffractor at the optimal velocity scan model pick location 83. The rays are traced through regions of different acoustic velocity by a process called ray tracing, just as optical ray paths can be determined through regions of different or varying index of refraction.

Figure 9:
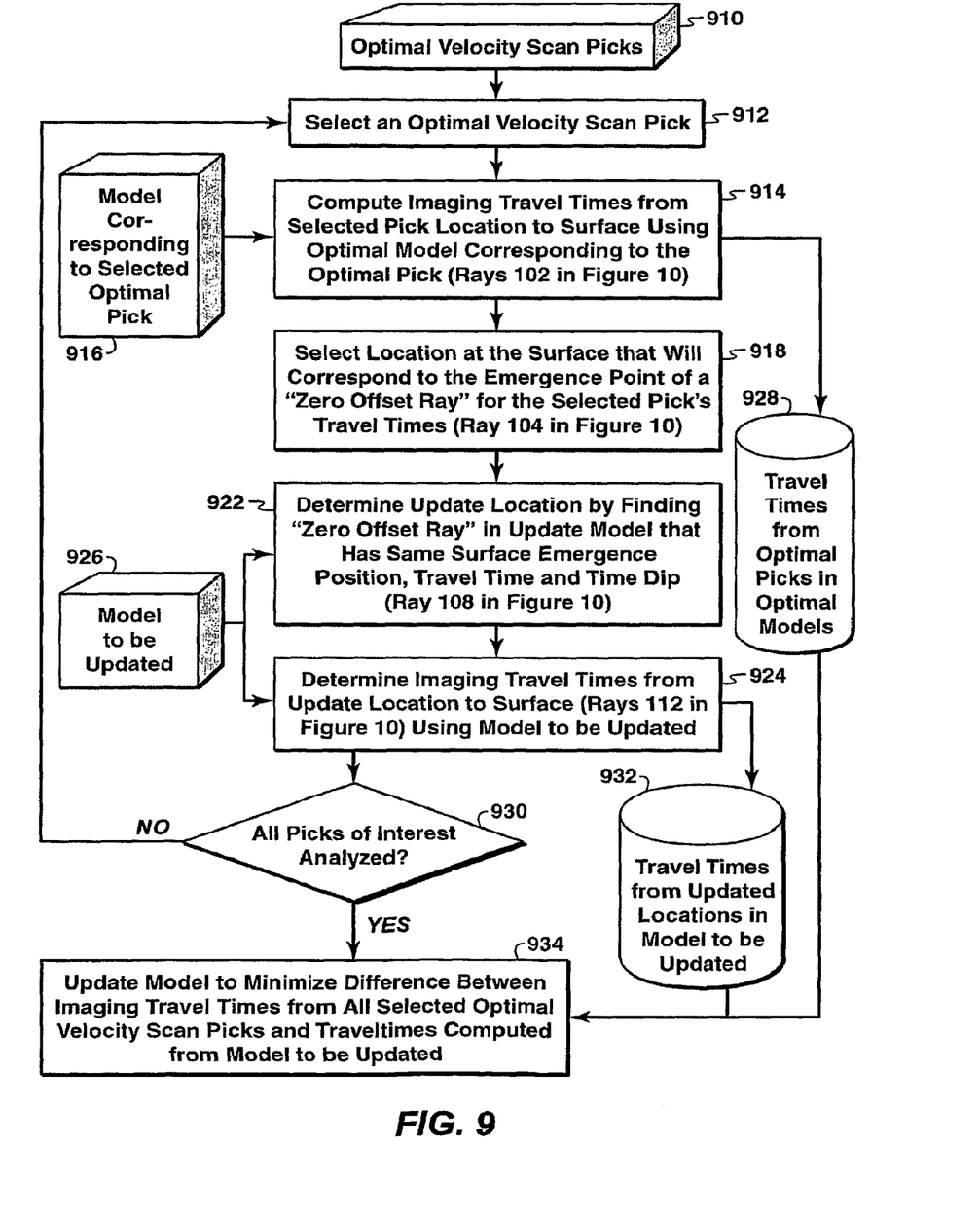
FIG. 9 is a flow chart of basic steps for updating a velocity model according to one embodiment of the present invention.

The invention will now be described in more detail. As discussed above, the goal when updating a velocity model using the present invention is to find a model that produces imaging travel times that are nearly equal to imaging travel times determined from the optimal velocity models corresponding to picked optimal velocity scan images. FIG. 9 is a flow chart showing basic steps in the present inventive method.

The process begins by obtaining at step 910 a set of optimal velocity scan picks. These picks can be generated, for example, by using the first portion (through step 70) of the conventional work flow shown in FIG. 7. The optimal velocity scan picks are a set of coordinates for the location of each pick and a parameter specifying which scan in the migration velocity scan suite was optimal at that location. Using FIG. 8 as an example, the optimal scan in the suite for pick location 83 was velocity model 85.

Figure 10:
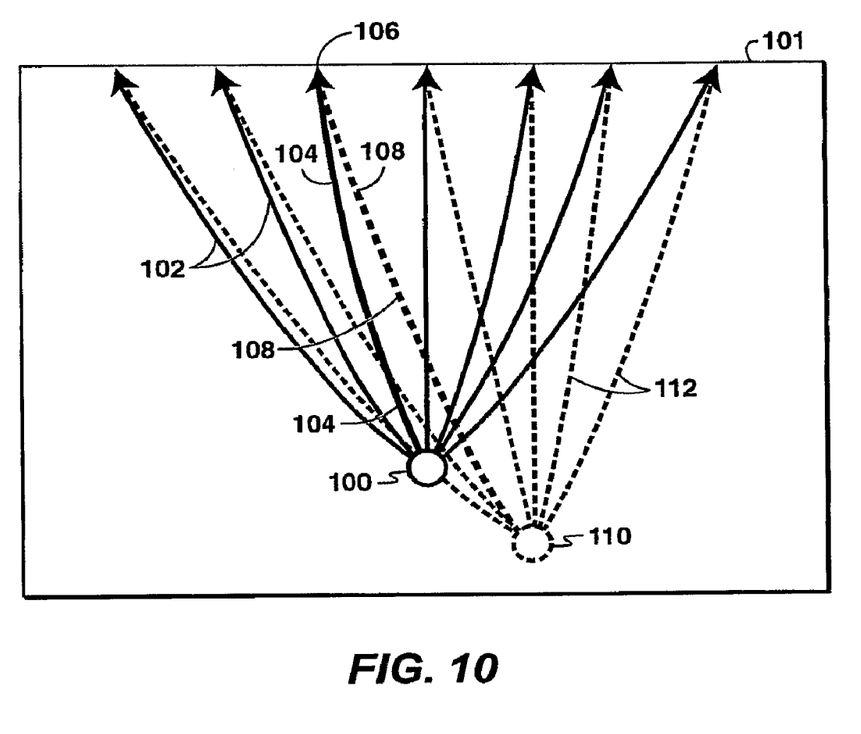
FIG. 10 is a diagram illustrating a method used to compute imaging travel times in an updated model to compare with optimal travel times computed from an optimal velocity scan pick.

At step 912, one optimal velocity scan pick is selected from the set of optimal picks. Then, at step 914, imaging travel times (preferably several, but at least two) from the location of the selected pick are computed, and stored at 928, using ray tracing for example. Referring to FIG. 10, these imaging travel times are the seismic times from the location 100 of the pick to the locations 101 of the seismic sources and receivers. These travel times are computed using velocity model 916 that was used to compute the selected velocity scan pick. Ray paths 102 in FIG. 10 correspond to these imaging travel times. (The five ray paths 81 in FIG. 8 also illustrate step 914.)

Looking ahead in the FIG. 9 flow chart, computing the fit of the model to be updated to the imaging travel times must take into account the fact that the model used to generate the picked velocity scan image probably has some error. Therefore, the true location of the pick is not known exactly, and consequently the present inventive method generally cannot use that location 100 as the point from which to compute imaging travel times in the update model. To solve this problem, the present invention uses the fact that for surface seismic data the zero-offset travel time should be constant independent of the imaging velocity model. Therefore, in step 918, a location 106 is chosen that will be taken to correspond to the exit location of a zero offset ray, i.e., where the zero offset ray intersects the surface 101. Criteria that can be used to choose the zero-offset ray location include:

Choose the ray that starts vertically from pick location 100. This would be a good criterion to use if the optimal velocity scan pick was based primarily on lateral resolution, e.g. focusing of faults, which appear in seismic data as a result of non-specular reflection.

Choose the ray that starts normal to a reflection imaged at pick location 100. This would be the desired criterion if the optimal velocity scan pick was based on consistency of the image as a function of an imaging gather variable such as source-receiver offset or angle of incidence, e.g., for specular reflections.

To ensure constancy of the zero offset travel time, step 922 determines the updated location 110 in model 926 that corresponds to both the pick location 100 and the selected zero-offset ray 104 in the optimal pick model. The update location 110 is determined so that the travel time between locations 110 and 106 in the update model 926 is the same as the travel time between locations 100 and 106 in the optimal pick model 916. This determination may be made, for example, by inverse ray tracing. Where inverse ray tracing is used, the location 110 is preferably further restricted such that the time dip (ray parameter) for energy traveling (ray 108) from location 110 to 106 in the update model 926 is equal to the time dip for seismic energy traveling (ray 104) from location 100 to 106 in the optimal pick model 916. The travel time dip of a zero offset ray is defined as the ratio of change in the travel time to a change in the horizontal location of the co-located source and receiver (dt/dx).

In step 924 of FIG. 9, the updated imaging travel times 932 from the update location 110 to the locations of the seismic sources and receivers are computed, using a method such as ray tracing. These updated imaging travel times correspond to the rays 112 in FIG. 10. In step 930, a decision is made regarding whether all picks of interest from the optimal velocity scan picks dataset 910 have been analyzed. If not, the process returns to step 912 and a new pick is analyzed. The results of the analysis from each selected location is appended to the optimal model imaging travel times data 928 and to the updated imaging travel times data 932. Usually, all optimal velocity scan picks in 910 are selected for analysis.

If all picks of interest have been analyzed, the process proceeds to step 934 of FIG. 9 in which model 926 is modified to reduce the difference between the optimal model travel times 928 and updated travel times 932. This modification of the model can be performed, for example, by any of the methods discussed previously, including manual updating and tomography. This modification of the model can also be performed to achieve consistency with any other available data such as those listed in Table 1. The modified model 926 becomes the model to be updated in a next iteration of this entire process, which would begin with step 910. This process can be iterated until a satisfactory fit to all data including the migration velocity scan travel times is achieved.

The velocity model updating method of this invention will generally lead to more accurate images of subsurface geology for several reasons including:

1. This invention directly optimizes the model to be consistent with imaging travel times rather than some converted form of these travel times (such as root-mean-square average of the optimal picked velocity model). It is thought to be very desirable to be consistent with imaging travel times, because they directly control the accuracy of a seismic image.
2. This invention uses various advantages available from migration velocity scans. In particular it improves velocity resolution by optimizing the model to fit travel times from both specular reflections and non-specular rays. This method can also be applied to stacks of the migration velocity scans, thus taking advantage of the maximum available signal-to-noise ratio.
3. This invention can be easily used in the region or layer stripping strategy (fulfilling steps 31-34 in FIG. 3) and with both the model based manual updating and tomographic model updating methods (see Table 2). This strategy and these two updating methods have several advantages relative to other model updating methods. In particular both methods allow for easy integration of all types of data into model updating. It should be noted that FIG. 3 describes layer stripping as well as region stripping. The difference is that in region stripping one tends to use thick regions with more complexly varying velocity within the region, whereas with layer stripping one tends to use thin layers with simple velocity variation.

The published methods discussed in the first part of this document all lack at least one of these advantages. Pica, Fei and McMechan, and X. Wang et al. are incompatible with the region stripping strategy and therefore cannot claim advantage 3 above. The method of Audebert, et al. has none of the advantages 1 to 3. This method optimizes the model to fit root-mean-square averages of the model, only uses specular reflections, and is inconsistent with model based manual updating and tomography. The methods of Guillaume and B. Wang et al. use only specular reflections. Also, Guillaume's method cannot be applied to stacks of the migration velocity scan images. Thus, the Guillaume and B. Wang methods do not have advantage 2 above.

The foregoing application is directed to particular embodiments of the present invention for the purpose of illustrating it. It will be apparent, however, to one skilled in the art, that many modifications and variations to the embodiments described herein are possible. For example, the invention is described as providing a velocity model for migration of seismic data. The velocity model of the invention can be used for other purposes, such as pore pressure prediction. Moreover, the velocity model may include anisotropy parameters. (See, for example, Thomsen, "Weak elastic anisotropy," *Geophysics* 51, 1954-1966 (1986).) All such modifications and variations are intended to be within the scope of the present invention, as defined in the appended claims. It will be evident to the skilled practitioner that the invention is preferably performed with the aid of a computer, i.e., the preferred embodiments are computer implemented. The updated velocity model resulting from the present inventive method may then be downloaded or stored in computer memory.

The invention claimed is:

1. A method for generating a velocity model from seismic reflection data obtained from a subterranean survey region, said model giving seismic velocity as a function of location in the region, said method comprising:
   (a) generating a velocity model of the subsurface region for updating;
   (b) obtaining a migration velocity scan from the seismic data, said scan including a set of seismic images created by migrating the seismic data using a suite of test velocity models of the subterranean region;
   (c) selecting an optimal pick from the velocity scan, said optimal pick corresponding to a particular test velocity model and to a particular (x,y,z) location in the subterranean region;
   (d) computing imaging travel times from the selected optimal pick location to a plurality of locations on the subterranean region's surface using the test velocity model corresponding to the selected optimal pick, wherein rays corresponding to the imaging travel times from the selected optimal pick location to the plurality of surface locations include at least one non-specular ray;
   (e) determining a surface location corresponding to an emergence point of a zero-offset ray from the (x,y,z) location corresponding to the selected optimal pick, using the test velocity model corresponding to the selected optimal pick;
   (f) determining an update location in the velocity model for updating such that a zero-offset ray from the update location has substantially the same surface emergence location and travel time as the zero-offset ray from the (x,y,z) location corresponding to the selected optimal pick;
   (g) computing imaging travel times from the update location to the plurality of surface locations selected in step (d) using the velocity model; and
   (h) updating the velocity model to reduce any differences between the imaging travel times computed in (d) for the optimal pick and the corresponding travel times computed in (g) using the velocity model;
wherein at least the computing imaging travel times steps are performed using a computer programmed to perform those steps.

2. The method of claim 1, further comprising repeating steps (c)-(g) for at least one additional optimal pick from the velocity scan, and including results of those steps in adjusting the velocity model.

3. The method of claim 1, wherein imaging travel times are computed using ray tracing.

4. The method of claim 1, wherein inverse ray tracing is used in determining an update location in the velocity model for updating such that a zero-offset ray from the update location has the same surface emergence location as the zero-offset ray from the (x,y,z) location corresponding to the selected optimal pick.

5. The method of claim 4, further comprising determining time dip of the zero-offset ray from the (x,y,z) location of the selected optimal pick is determined, and further constraining determination of the update location in the velocity model for updating such that a zero-offset ray from the update location has substantially the same time dip.

6. The method of claim 1, wherein model updating is performed using a method selected from a group consisting of: (i) vertical updating; (ii) model based manual updating; and (iii) tomography.

7. The method of claim 1, further comprising constraining model updating with available data of at least one of the following types: (i) surface seismic reflections; (ii) vertical checkshots; (iii) surface seismic direct arrivals; (iv) formation tops; (v) offset checkshots; and (vi) sonic logs.

8. The method of claim 1, wherein the migration velocity scan is a pre-stack migration velocity scan.

9. The method of claim 1, wherein the migration velocity scan is formed by stacking a plurality of pre-stack migration velocity scans.

10. The method of claim 2, further comprising replacing the velocity model for updating by the adjusted update model and repeating steps (b)-(h), and further iterating until a preselected convergence criterion is satisfied or other stopping point is reached.

11. The method of claim 1, wherein the zero-offset ray from the (x,y,z) location corresponding to the selected optimal pick is a ray that starts upward vertically from said (x,y,z) location.

12. The method of claim 1, wherein the zero-offset ray from the (x,y,z) location corresponding to the selected optimal pick is a ray that starts upward in a direction perpendicular to a reflector imaged at said (x,y,z) location.

13. The method of claim 1, wherein the velocity model includes anisotropy parameters.

14. A method for generating a velocity model from seismic reflection data obtained from a subterranean survey region, said model giving seismic velocity as a function of location in the region, said method comprising:
   (a) generating a velocity model of the subsurface region for updating;
   (b) obtaining a migration velocity scan from the seismic data, said scan including a set of seismic images created by migrating the seismic data using a suite of test velocity models of the subterranean region;
   (c) selecting an optimal pick from the velocity scan, said optimal pick corresponding to a particular test velocity model and to a particular (x,y,z) location in the subterranean region;
   (d) computing imaging travel times from the selected optimal pick location to a plurality of locations on the subterranean region's surface using the test velocity model corresponding to the selected optimal pick, wherein rays corresponding to the imaging travel times from the selected optimal pick location to the plurality of surface locations include at least one non-specular ray;
   (e) computing imaging travel times from the (x,y,z) location corresponding to the selected optimal pick to the plurality of surface locations selected in step (d) using the velocity model; and
   (f) updating the velocity model to reduce and differences between the imaging travel times computed in (d) for the optimal pick and the corresponding travel times computed in (e) using the velocity model;

wherein at least the computing imaging travel times steps are performed using a computer programmed to perform those steps.

15. A method for producing hydrocarbons from a subterranean region, comprising:

(a) obtaining seismic data from the subterranean region;
(b) obtaining an initial velocity model of the subterranean region for updating;
(c) obtaining a migration velocity scan from the seismic data, said scan including a set of seismic images created by migrating the seismic data using a suite of test velocity models of the subterranean region;
(d) obtaining a selected optimal pick from the velocity scan, said optimal pick corresponding to a particular test velocity model and to a particular (x,y,z) location in the subterranean region;
(e) obtaining computed imaging travel times from the selected optimal pick location to a plurality of locations on the subterranean region's surface using the test velocity model corresponding to the selected optimal pick, wherein rays corresponding to the imaging travel times from the selected optimal pick location to the plurality of surface locations include at least one non-specular ray;
(f) obtaining a surface location determination corresponding to an emergence point of a zero-offset ray from the (x,y,z) location corresponding to the selected optimal pick, using the test velocity model corresponding to the selected optimal pick;
(g) obtaining a determination of an update location in the velocity model for updating such that a zero-offset ray from the update location has substantially the same surface emergence location and travel time as the zero-offset ray from the (x,y,z) location corresponding to the selected optimal pick;
(h) obtaining a computation of imaging travel times from the update location to the plurality of surface locations selected in step (e) using the velocity model;
(i) obtaining an adjusted velocity model, adjusted to reduce any differences between the imaging travel times computed in (e) for the optimal pick and the corresponding travel times computed in (h) using the velocity model;
(j) obtaining images of subsurface reflectors from the subterranean region, imaged using the adjusted velocity model; and
(k) drilling a well into a reservoir disclosed in the imaged subsurface reflectors, and producing hydrocarbons from the well.

* * * * *